United States Patent [19]

Staar

[11] 4,024,954
[45] May 24, 1977

[54] APPARATUS FOR BLOCKING A CASSETTE IN A STORAGE MAGAZINE

[76] Inventor: Marcel Jules Helene Staar, 479 Avenue Louise, Brussels, Belgium

[22] Filed: Dec. 18, 1975

[21] Appl. No.: 642,175

[30] Foreign Application Priority Data

Dec. 18, 1974 Belgium .............................. 823527

[52] U.S. Cl. ................................ 206/387; 221/87; 312/319

[51] Int. Cl.$^2$ ................. B65D 85/672; B65D/85/67

[58] Field of Search .................... 206/387, 456, 74; 312/246, 111, 319; 221/87, 89, 59

[56] References Cited

UNITED STATES PATENTS

| 3,343,716 | 9/1967 | Peebles | 221/59 |
|---|---|---|---|
| 3,677,396 | 7/1972 | Staar | 221/87 |
| 3,777,881 | 12/1973 | Schwartz | 206/387 |
| 3,856,369 | 12/1974 | Commiant | 206/387 |
| 3,899,229 | 8/1975 | Ackeret | 206/387 |

Primary Examiner—William T. Dixson, Jr.

[57] ABSTRACT

Apparatus for blocking a cassette in a storage magazine having housings with slidable drawers adapted for receiving respective cassettes. The drawers can be retracted to a stored locked position in which a recall spring is compressed and when the drawer is unlocked, the spring displaces the drawer to an extended position. Studs are provided on the drawers for loosely engaging bores in reels in the cassettes and the recall springs can act directly or indirectly on the cassettes in the associated drawers, at least during retraction of the drawers, to take up the play between the studs and the reels thereby to block movement of the reels.

8 Claims, 2 Drawing Figures

APPARATUS FOR BLOCKING A CASSETTE IN A STORAGE MAGAZINE

There exist at present in the market magazines adapted to receive and store recording cassettes. In certain types of magazines, the cassettes are placed in individual drawers which can be manually pressed in order to lock them in closed position. When the draw is unlocked, a recall spring in which energy has been stored when the drawer has been pressed into its housing can be released and displace the drawer to its open position. In the cassette there are two small reels on which the type, the information carrier, can be wound an unwound. For tolerance reasons, these reels are mounted with substantial play in order that they can assume an unstressed position on the drive axles of the apparatus in order to reproduce the information carried on the tape. When the magazine is subjected to vibrations as is the case, for example, in an automobile the reels can turn and untimely release the tape in the cassette. Certain storage containers and magazines in the form of drawers are sometimes provided with members adapted to impede undesired rotation of the reels, for example, by small walls directly molded in the containers or the drawers which receive the cassettes. For reasons of economy, the tolerances of the different molded members forming the magazine are very great in order that they enter the reels in the cassette and the drawer. They can, because of the provided play, produce an objectionable noise when subjected to vibrations or impact.

An object of the present invention is to provide an apparatus which eliminates the noise due to the impact between the drawers, cassettes and reels.

Another object of the invention is to provide a blocking apparatus which is active only when the drawer is in its retracted position.

Another object of the invention is to provide an apparatus which allows the utilization, to eliminate the play, of the same recall spring as that which is already employed to displace the drawer.

In order to achieve these objectives, the apparatus according to the present invention is characterized by the provision of means on which the recall spring, serving to displace the drawer to its open position, can act on the cassette in order to block it. One portion of this spring can bear, for example, against the cassette while also bearing on the drawer itself, or, for example, can bear on a flexible portion of the drawer which in turn bears on the cassette. Means are also provided in order that the apparatus can act only in the retracted position of the drawer.

In order to understand the invention better, there will be described hereafter one embodiment thereof.

Figure 1:
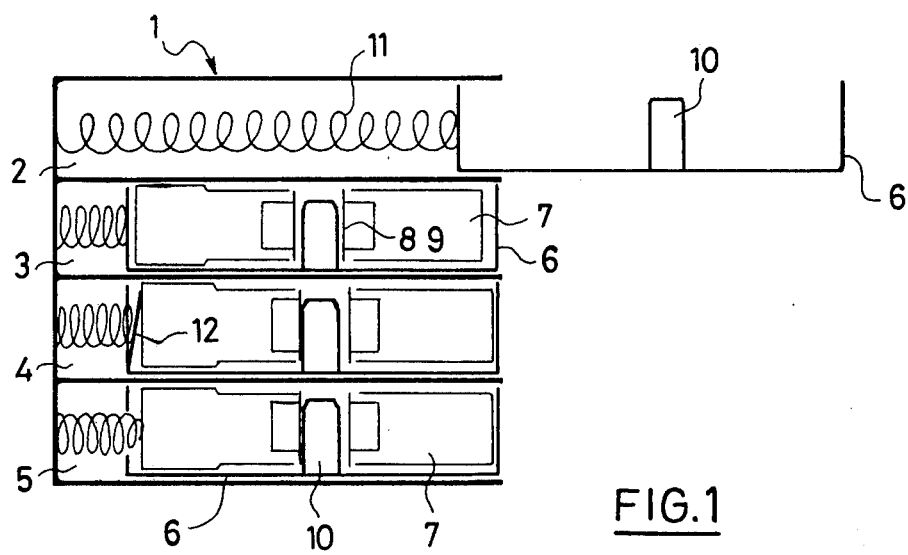
FIG. 1 is a side view diagrammatically illustrating a magazine.
Figure 2:
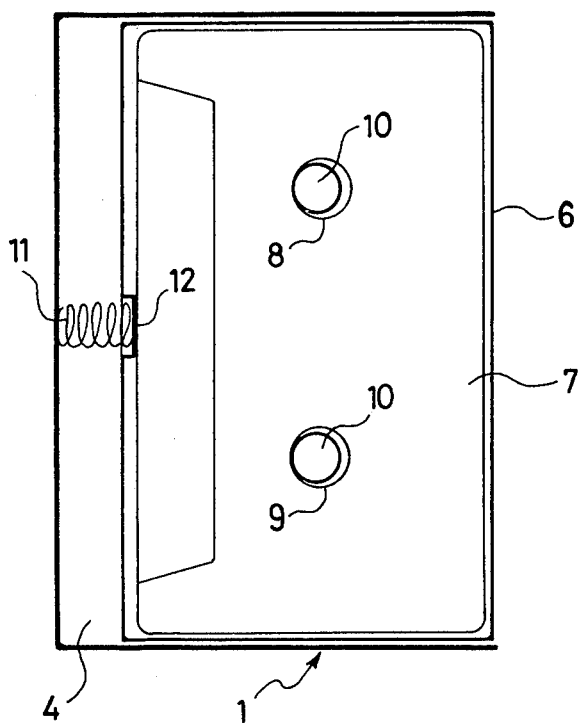
FIG. 2 is a plan view of one housing of such magazine.

In FIG. 1 there is seen a magazine 1 composed of four housings of recesses 2,3,4,5 adapted to each receive a drawer 6 in which can be placed a cassette 7. The cassette 7 contains confined reels 8 and 9 which are mounted with play (FIGS. 1 and 2) on which the tape can be wound and unwound.

The drawers are provided with studs 10 which prevent the reels 8 and 9 from turning when the cassette is placed in the drawer.

Even if the studs 10 suitably engage the reels 8 and 9, the cassette can shift by the magnitude of the play which is provided between the walls thereof and the loosely mounted reels 8 and 9.

A recall spring 11 normally displaces the drawer to its open position.

It is therefore seen in the recess 3 that the cassette and its reels can shift slightly with respect to the drawer in which it is placed.

According to the invention, there is provided, for example, in the molding of the rear wall of the drawer a portion which forms a flexible tongue 12 against which bears the recall spring which serves to displace the drawer. The shape of this tongue is realized in a manner such that when the pressure of the spring 11 is low, that is when it is substantially relaxed, at the time of the complete opening of the drawer, the flexible tongue 12 is found in the same plane as the remainder of the wall of the drawer and when the pressure of the spring 11 becomes much greater, that is, when it is compressed by the retraction of the drawer, the flexible wall bends under the pressure and bears against the cassette to block the same against the studs 10 thus eliminating, at the same time, the play of the reels. This is evident from FIG. 1 as shown in housing 4 and in FIG. 2. When the drawer is unlocked and released in its open position, the flexible tongue returns to its normal position in the same plane as the remainder of the rear wall of the drawer and the cassette is absolutely free.

It is seen in the recess 5 of FIG. 1 that the spring 11 while bearing on the drawer 6 can pass partially through an opening provided in the rear wall of the drawer in order that the spring can act at the same time on the cassette and block the same as in the example of the housing 4.

It is to be understood that the locking and unlocking means for the drawer in the associated housing is of conventional nature and is not disclosed in detail hereinabove. Such means can consist of a simple pivotal latch between the magazine and the associated drawer at the outlet opening of the recess.

What is claimed is:

1. Apparatus for blocking a cassette in a storage magazine having housings with slidable drawers for receiving respective cassettes and adapted for being retracted in a stored, locked position against the action of a recall spring which can displace the drawer to an extended position when the drawer is unlocked, an improvement comprising stud means on said drawers loosely engaging bores in reels in said cassettes, and means enabling the recall spring to act on said cassette in the associated drawer at least during retraction of said drawer taking up the play both between the stud means and the reels in the cassette to block movement of the reels by said stud means.

2. Apparatus as claimed in claim 1 wherein said means enabling the recall spring to act on the cassette serves to provide direct contact between the spring and the cassette.

3. Apparatus as claimed in claim 1 wherein said means enabling the recall spring to act on the cassette serves to provide indirect contact between the spring and the cassette.

4. Apparatus as claimed in claim 1 wherein said means enabling the recall spring to act on the cassette in constituted by an aperture provided in said drawer in a position so that said spring extends through said aperture into contact with the cassette.

5. Apparatus as claimed in claim 1 wherein said means enabling the recall spring to act on the cassette comprises a flexible tongue on said drawer, said spring bearing against said tongue which in turn bears against said cassette when the drawer is in retracted position.

6. Apparatus as claimed in claim 5 wherein said drawer has a rear wall facing said spring, said tongue being integrally formed with said rear wall.

7. Apparatus as claimed in claim 6 wherein said flexible tongue is bendable so as to bear against the cassette when the drawer is closed and the spring is compressed to a maximum, whereas in the open position of the drawer, the spring is relaxed and the tongue occupies a normal position out of contact with the cassette.

8. Apparatus as claimed in claim 7 wherein said tongue in said normal position is substantially in the plane of said rear wall.

* * * * *